United States Patent [19]

Ford, Jr. et al.

[11] Patent Number: 4,464,605
[45] Date of Patent: Aug. 7, 1984

[54] THREE TERMINAL SOLID STATE PILOT LIGHT

[75] Inventors: David E. Ford, Jr., Milwaukee; Daniel G. Kannenberg, Waukesha, both of Wis.

[73] Assignee: Allen-Bradley Company, Milwaukee, Wis.

[21] Appl. No.: 359,268

[22] Filed: Mar. 18, 1982

[51] Int. Cl.³ .............................................. H01J 1/60
[52] U.S. Cl. ..................................... 315/134; 315/129; 315/312; 250/551; 340/641
[58] Field of Search ............... 315/134, 152, 250, 254, 315/312, 313; 340/641, 642; 324/414; 250/551

[56] References Cited

U.S. PATENT DOCUMENTS

| | | | |
|---|---|---|---|
| 2,839,741 | 6/1958 | Kratville | 340/213 |
| 3,040,243 | 6/1962 | Weiss | 324/20 |
| 3,304,431 | 2/1967 | Biard | 250/551 |
| 3,335,249 | 8/1967 | De Smidt et al. | 200/167 |
| 3,739,334 | 6/1973 | Hocking | 340/334 |
| 3,840,801 | 10/1974 | Kellogg et al. | 324/21 |
| 3,938,000 | 2/1976 | Higashide | 315/205 |
| 4,019,128 | 4/1977 | Chebowski | 324/21 |
| 4,211,956 | 7/1980 | Bloyd | 315/312 |

OTHER PUBLICATIONS

"Dual Input Pilot Lamp" Product Data Sheet 1800T Jul. 1975-Allen Bradley Corp.

*Primary Examiner*—Harold Dixon
*Attorney, Agent, or Firm*—Quarles & Brady

[57] ABSTRACT

In a pilot light usable for monitoring industrial control circuits a set of three terminals comprising a signal terminal, a test terminal and a line, or return terminal, with a signal circuit network between the signal and line terminals that supplies current to a lamp when a voltage is applied to the signal terminal, and with a test circuit network between the test and line terminals that supplies current to the lamp when a voltage is applied to the test terminal. Each circuit network includes a triac and a trigger branch subcircuit for controlling the associated triac.

1 Claim, 3 Drawing Figures

THREE TERMINAL SOLID STATE PILOT LIGHT

BACKGROUND OF THE INVENTION (a) Field of the Invention

The invention described herein relates to pilot lights, and in particular is applicable to pilot lights used for monitoring industrial control circuits.

(b) The Prior Art

A variety of circuit arrangements have been adopted for pilot lights used in the monitoring of control circuits that govern the operation of machines and manufacturing processes. Some pilot lights merely comprise lamps for connection to the circuit elements they are to monitor, so that the lamps light-up when the circuit elements are operated. In these pilot lights the lamp voltages are the same as that of the control circuits in which they are used, which typically may be 110 volts. When it is desired to have a lower voltage lamp in a pilot light a transformer is included within the pilot light housing, with the lamp being connected across the transformer secondary winding. Lamp voltages may then be decreased to a typical value of 6.3 volts. Such a low lamp voltage permits replacement of burned out lamps without shutting down associated equipment. Also, the lamp filament will be thicker than for high voltage lamps, rendering the lamp sturdier and less susceptible to failure in environments where vibration and shock become a factor of lamp life.

In other pilot lights additional circuit components are included in the light assembly to provide a test function, in which the integrity of the lamp may be tested to check whether the lamp is burned out or inoperative. To include such a test function for a pilot light, a test terminal is added to the light assembly that supplements the usual signal terminal (for connection to the device being monitored) and a line terminal (for making a return connection to the control circuit). Internal pilot light connections are also provided that apply a test voltage to the lamp whenever an external voltage is applied to the test terminal. Whenever a test voltage is applied, it is necessary to isolate the test voltage from the signal terminal, so that such test voltage is not fed to the control circuit being monitored. Similarly, the signal voltages applied to the signal terminal should be isolated from the test terminal, so that they are not fed through the test circuit to the other pilot lights.

Isolation between signal and test terminals may be obtained by use of an electromechanical relay, with the relay coil being energized by a voltage applied to the test terminal to switch the movable relay contacts between the signal and test terminals. Then, when a voltage from one of these terminals is applied to the lamp, the other terminal is isolated by an open circuit. Such a use of a relay lends itself to the inclusion within a pilot light of a step-down transformer to achieve a low voltage lamp, and a combination of a relay and transformer has been used extensively.

Isolation may also be obtained by use of solid state circuitry in place of a relay. Blocking diodes connected to the signal and test terminals have commonly been used for this purpose. A diode connected to the signal terminal only allows current flow from the signal terminal toward the lamp, and blocks current flow in the reverse direction. Similarly, a diode connected to the test terminal only allows current flow from the test terminal toward the lamp, and blocks current flow in the reverse direction. However, it has not been practical in commercial pilot lights to include a step-down transformer, to provide a low voltage lamp, while still using only three terminals for the pilot light. This is because the diodes would be in the transformer primary winding circuit, and would transmit pulsating d.c. current to the transformer making it an inefficient device.

Some pilot lights provide a diode type isolation with a step-down transformer for the lamp by including a separate pair of test terminals that apply a separate, reduced test voltage to the pilot light. The pilot light transformer then only handles normal signal voltages, and isolation diodes can be incorporated in the transformer secondary winding circuit, rather than in the primary winding circuit. In this construction there is the disadvantage of introducing a fourth terminal and requiring an extra transformer for supplying the low voltage test current. These disadvantages have reduced commercial acceptance of this construction.

Another suggestion has been the use of a triac in a pilot light that is connected in series with the lamp illuminating circuit. The triac is switched into a conducting state by voltage signals applied either to a signal terminal connected to the device being monitored, or a test terminal connected to a test switch. This approach, however, again requires a four terminal pilot light, and has not received commercial recognition. Instead of such construction it would be desirable to have a solid state pilot light incorporating a low voltage lamp, but with only three external terminals.

SUMMARY OF THE INVENTION

The present invention provides a three terminal pilot light using solid state components with which a transformer may be combined to provide a low voltage lamp. This invention resides in a signal circuit network that includes a first on-off solid state device for supplying lamp current, a test circuit network that includes a second on-off solid state device for supplying a test current to the lamp, and means in each of the signal and test circuit networks for operating the respective on-off device.

In one preferred arrangement, the signal circuit network includes a triac as the on-off device, and is connected on one side to a signal terminal and on the other side through a transformer to a line terminal. The transformer energizes a low voltage lamp connected to its secondary winding. The test circuit network includes a second triac and is connected between a test terminal and the same transformer. The transformer, then, is serially connected with both the signal and test circuit networks, and it is through the transformer that the signal and test circuit networks are joined to the line terminal. Thus, only three terminals are needed for a pilot light utilizing solid state components that incorporate a test function and provide a low voltage lamp of lesser voltage than the control circuit which the pilot light monitors.

To operate the pair of triacs in the signal and test circuit networks, each network includes a trigger branch that governs the firing, or conduction of the associated triac. These trigger branches can take different forms. In one form, the triac is a light responsive type triac, and a light emitting diode is included in the trigger branch which is activated when a voltage is applied to the associated signal, or test terminal. Thus, considering the signal circuit network, if a switch in a monitored control circuit is closed to apply a voltage to the pilot light signal terminal, then the light emitting diode in the trigger branch of the signal circuit network is activated. The light coupled triac responds to the diode and turns on to conduct a lamp illuminating current to the lamp transformer. Unique to this arrangement is the inclusion of the two signal and test circuit networks, each with its own trigger branch circuit, without any requirement of an additional terminal for the pilot light. Also, there is isolation between the signal and test terminals such that a voltage at one terminal will not cross to the other.

Identical signal and test circuit networks, each with a trigger branch subcircuit as described above can be used in a pilot light if desired. This is illustrated in the first embodiment described herein. Variations can also be adopted for these circuits, so that they are not necessarily alike. For example, in the second described embodiment the signal circuit network is modified to have a three terminal triac with a control gate. The trigger branch for the signal circuit supplies a firing voltage for the triac at a small timed interval after each half cycle of the signal terminal voltage has commenced. This time delay can be established by a timing circuit in the trigger branch responding to the voltage applied to the signal terminal, and the purpose of the time delay is to permit for an interaction between the signal and test circuit networks. The test circuit network is similar to that described above for the first embodiment, but includes a second light emitting diode activated when a voltage is applied to the pilot light test terminal. This second light emitting element is light coupled to a light responsive triac in the trigger branch of the signal circuit network, and functions to disable the trigger branch. As result, when the test circuit network is activated the signal circuit network cannot turn on its triac, and the test circuit network will provide the sole voltage applied to the lamp transformer. This arrangement is useful whenever there may be phase displacements between normal signal and test voltages.

It is an object of the invention to provide a pilot light that includes a test function which utilizes solid state components and requires only three terminals for its operation.

It is another object to provide a compact pilot light in which the circuits for feeding lamp current to a lamp transformer require a minimal space and are of light weight.

It is a further object to provide a pilot light utilizing solid state components which do not generate excessive heat.

A still further object is to provide isolation between the signal and test terminals of a pilot light.

The foregoing and other objects and advantages of the invention will appear from the following description. In the description, reference is made to the accompanying drawings, which form a part hereof, and in which there is shown by way of illustration and not of limitation preferred embodiments of the invention. Such embodiments do not represent the full scope of the invention, and reference is made to the claims herein for interpreting the breadth of the invention.

DESCRIPTION OF THE PREFERRED EMBODIMENTS

Figure 1:
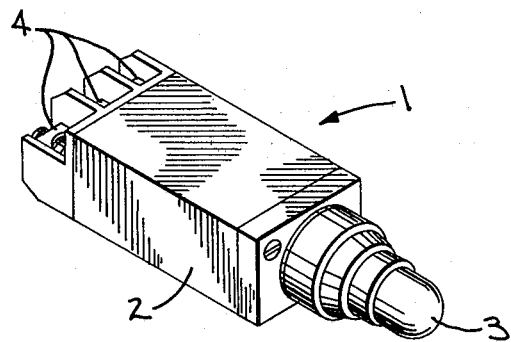
FIG. 1 is a view in perspective of a pilot light embodying the present invention.
Figure 2:
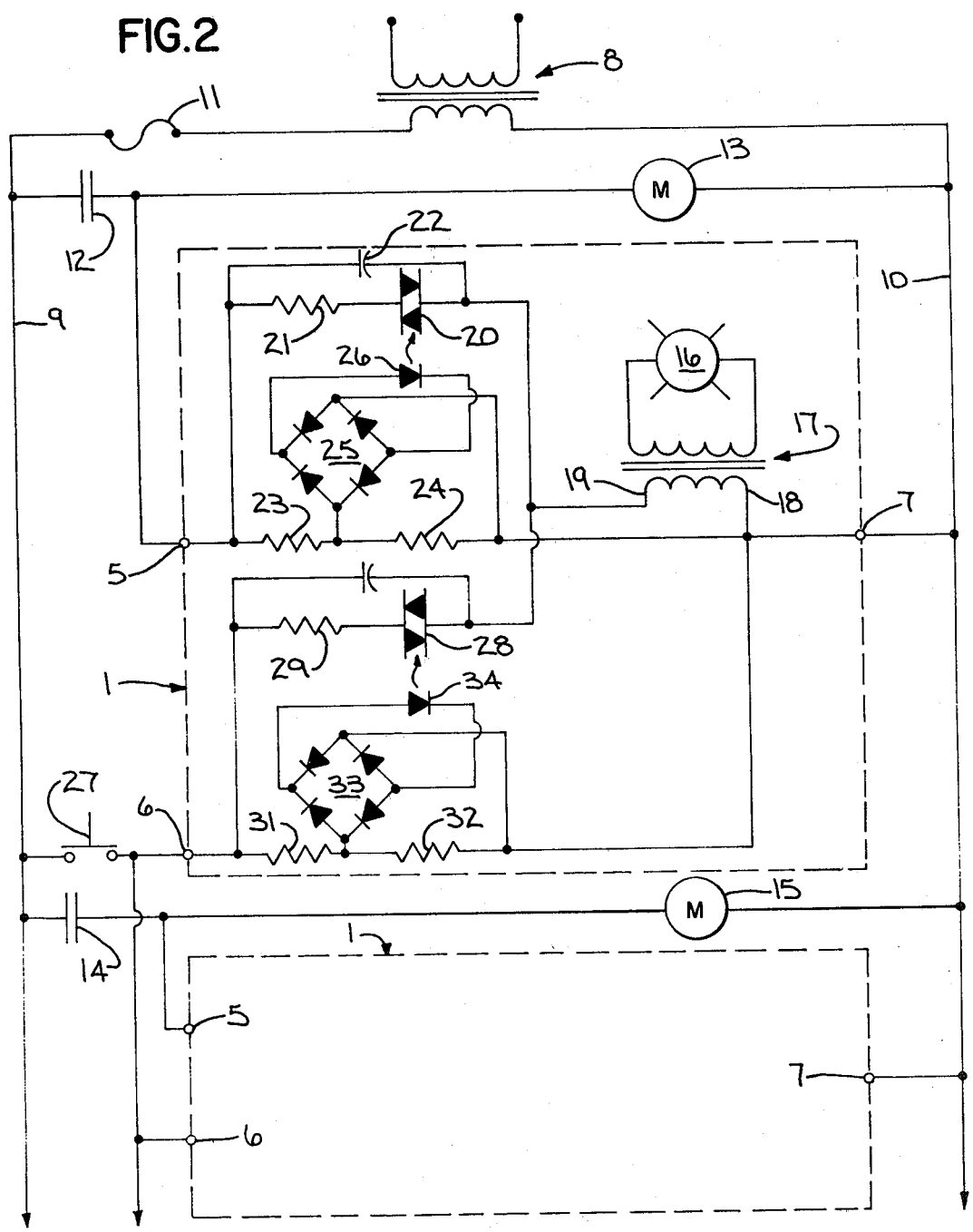
FIG. 2 is a schematic wiring diagram showing a control circuit having elements to be monitored and a pair of pilot lights embodying the invention.

In FIG. 1 there is shown a pilot light 1 having an external configuration of usual commercial form. It has a box-like housing 2 with a lens 3 at one end and a set of three terminals 4 at the other end. The present invention fits within this configuration and therefore is compatible with commonly available pilot lights. Referring to FIG. 2, a pair of the pilot lights 1 are schematically shown by dotted line enclosures. The internal circuitry of the upper pilot light 1 is depicted, and it is to be understood that the circuit for the lower pilot light 1 is the same. The circuit elements outside the dotted line enclosures comprise a control circuit with which the pilot lights 1 are used. This control circuit is for purposes of illustration only and plays no part of the invention. Control circuits for which the pilot lights 1 are intended for use may take a variety of forms, and that of FIG. 1 is a simplified circuit useful primarily for explaining the invention.

Referring to the upper pilot light 1 of FIG. 2, the three terminals comprise a signal terminal 5 for connection to a control circuit element to be monitored, a test terminal 6 for supplying a test voltage to the pilot light and a line, or return terminal 7 that connects into the control circuit for completing the pilot light circuit connections. In the control circuit, there is an input transformer 8 that feeds lines 9 and 10. The line 9 includes an overload protective device 11 that can be a fuse, circuit breaker or combination thereof. To represent control circuit elements that are to be monitored by the pilot lights 1 there is a first motor control switch 12 that turns a motor 13 on and off, and a second motor control switch 14 that turns a second motor 15 on and off.

The motor control switches 12, 14 could be manually operated on-off switches, remote controlled across the line starters, limit switches, or other forms of switching devices. Whenever a switch 10 or 14 is closed the control line voltage appearing across the lines 9, 10 is applied to the associated pilot light 1, for illuminating the pilot light and thereby monitoring the switch operation. The motors 13, 15 could be fan motors, motors for operating a machine tool or some other device, or instead of motors could be solenoids or some other circuit element.

The internal circuit of the upper pilot light 1 includes a lamp 16 connected across the low voltage, secondary winding of a step-down transformer 17. One side 18 of the transformer primary winding is joined to the line terminal 7, and the other side 19 is connected to branches of signal and test circuit networks to be described. Connected between the transformer side 19 and the signal terminal 5 is a light responsive triac 20 that is in series with a current limiting resistor 21. Across the triac 20 and resistor 21 is a capacitor 22 that by-passes high peak value transient voltages around the triac 20 as a protection for the triac in case any such voltages might appear across the terminals 5, 7. This can occur upon decay of magnetic fields upon deenergization of inductive control devices in the control circuit, such as the windings of the motor 13.

The triac 20, resistor 21 and capacitor 22 form a supply branch subcircuit of the signal circuit network of the pilot light 1, supplying current for lamp illumination whenever the triac 20 is conducting. A pair of resistors 23, 24 are joined in series between the signal terminal 5 and line terminal 7, and across the resistor 24 is the input side of a bridge type rectifier 25 comprised of a set of four diodes. The output side of the rectifier 25 feeds a light emitting diode 26. The resistor 23 functions as a voltage dropping device and current limiter, and the resistor 24 prevents very small currents from turning on the diode 26. Thus, whenever normal control circuit voltage appearing across lines 9, 10 is applied across the signal terminal 5 and line terminal 7 the bridge rectifier 25 feeds direct current to the light emitting diode 26. The light responsive triac 20, being in light receiving position relative to the diode 26, is activated. Current then flows through the triac 20 to supply lamp illuminating current to the primary of the transformer 17.

The signal circuit network for the pilot light 1 is comprised of two branches. The first branch is the supply branch, as previously identified, and the second branch is a trigger branch subcircuit made up of the rectifier 25, light emitting diode 26 and resistors 23, 24. This trigger branch is in parallel with the supply branch and the transformer 17.

The test terminal 6 is connected through a normally open test switch 27 to the control circuit line 9. the test switch 27 may be a manually operable push button of usual construction, and upon its closure control line voltage is applied across the terminals 6, 7 to apply a test voltage to the pilot light 1 for the purpose of testing the integrity, or operativeness of the lamp 16.

A test circuit network for the testing of lamp 16 is like the signal circuit network described above. First, there is a supply branch, for feeding lamp illuminating current to one side 19 of the transformer primary winding, which comprises a light responsive triac 28, a resistor 29 in series with the triac 28 and a capacitor 30. Then, there is a trigger branch subcircuit connected between the terminals 6 and 7 made up of a pair of serially connected resistors 31, 32, a bridge rectifier 33 having its input across the resistor 32, and a light emitting diode 34 connected across the output of the bridge rectifier 33 that is positioned in light transmitting relation to the triac 28. This trigger branch is in parallel with the supply branch and the transformer secondary. Thus, when the test switch 27 is closed current flows through the rectifier 33 and light emitting diode 34 of the trigger branch, the light turns the triac 28 into an "on" condition, and current flow through the triac 28 supplies the transformer 17 to illuminate the lamp 16 on the low voltage secondary side of the transformer 17. This testing of the lamp 16 can take place whether or not the switch 12 is closed, so that the test function does not interfere with control circuit operation.

The lower pilot light 1 of FIG. 2, being like the upper pilot light 1, has three terminals 5, 6 and 7, and responds to closing and opening of the switch 14 by illuminating and turning off its lamp (not shown). It also has the same test function, and testing of both pilot lights 1 is simultaneously accomplished through operation of the single test switch 27. Additional pilot lights can be tested off the switch 27, and the control circuit cn contain numerous switches to be monitored by corresponding pilot lights, as is common in the control circuit art.

Figure 3:
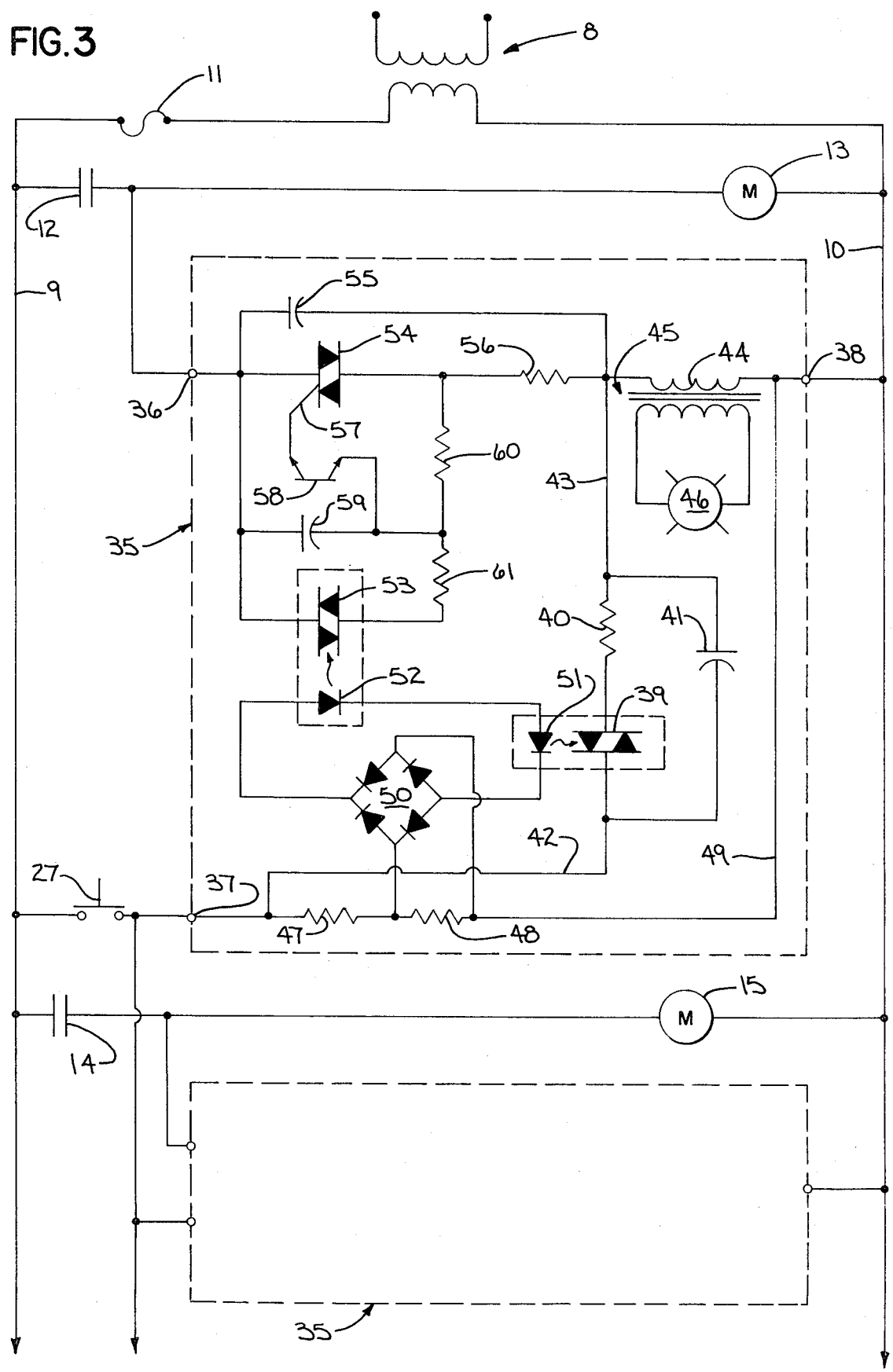
FIG. 3 is another schematic wiring diagram including a pair of pilot lights that comprise a second embodiment of the invention.

An alternative embodiment for the pilot light circuitry is shown in FIG. 3, where the control circuit has the same numerals as in FIG. 2 and a pair of like pilot lights 35 are shown that are connected into the control circuit. Each pilot light 35 has a signal terminal 36 for receiving a voltage that is to be monitored, a test terminal 37 to receive a test voltage upon depressing the test switch 27 to closed postion, and a line terminal 38 for joining with the control circuit line 10 and completing the pilot light cirduitry.

The upper pilot light 35 shows the internal circuitry, and referring first to the test circuit newtork within the pilot light, it is similar to that of FIG. 2. A supply branch subcircuit for conducting lamp illuminating current includes a light responsive triac 39, a resistor 40 in series with the triac 39, and a capacitor 41 across the triac 39 and resistor 40. These elements making up the supply branch are joined by a lead 42 to the test terminal 37 and by a lead 43 to one side of the primary winding 44 of a transformer 45. The opposite side of the winding 44 is joined to the line terminal 38. A lamp 46 is across the low voltage secondary of the transformer 45, and thus whenever the supply branch of the test circuit network conducts current it feeds the transformer 45 for illuminating the lamp 46.

The test circuit also includes a trigger branch subcircuit connected between the test terminal 37 and the transformer winding 44. Similarly as for the pilot light of FIG. 2, this trigger branch has a resistor 47 joined to the terminal 37, then a resistor 48 in series with the resistor 47 which is connected at its opposite end by a lead 49 to the line terminal 38. Across the resistor 48 is the input side of a bridge rectifier 50 made up of a set of four diodes in usual fashion, and across the output side of the rectifier 50 is a pair of serially connected light emitting diodes 51 and 52. This trigger branch is seen to be like those of FIG. 2, except for the inclusion of the second light emitting diode 52. The operation is also similar, the resistor 47 limiting current value and resistor 48 functioning to by-pass the rectifier 50 for requiring a minimal threshold voltage for activating the light emitting diode 51.

The light emitting diode 52 is in light transmitting relation to a light responsive triac 53 in the signal circuit network of the pilot light 35. This signal circuit differs from that of the pilot light 1 of FIG. 2. It has a three element triac 54 between the signal terminal 36 and the transformer primary winding 44 and it feeds the illuminating current for the lamp 46 when a voltage is applied across the terminals 36, 38 by a closure of the switch 12 that is being monitored by the pilot light. A capacitor 55 parallels the triac 54 that is non-conductive to the frequency of the control circuit being monitored, but it passes high potential peaks of high frequency transients, and together with a resistor 56 provides voltage and current protection for the triac 54.

The gate 57 of the triac is connected to one side of a diac 58, and the other side of the diac 58 is joined to the common connection of a capacitor 59 and a resistor 60. There is also a resistor 61 that limits surge currents in the triac 53. The capacitor 59 and resistor 60 are across the triac 54 and comprise a timing circuit for controlling the firing of the triac 54. The value of the resistor 60 is selected to have a time delay of about 3 millesecond for charging the capacitor 59 to the point where it establishes a current flow through the diac 58 and the triac gate 57 to turn on the triac 54. Thus, for each half cycle of a.c. voltage applied at the terminal 36 the triac 54 blocks current flow to the transformer primary winding 44 for a brief interval, and then it is fired, in response to the time delay circuit of capacitor 59 and resistor 60, to conduct lamp illuminating current.

The purpose of the delayed firing of the triac 54 is for providing an inter-circuit intelligence between the test circuit network joined to the test terminal 37 and the signal circuit network connected to the signal terminal 36. If the test terminal 37 is energized by a closure of test switch 27, then the triac 54 is prevented from conducting, and only one source, the test circuit voltage, will illuminate the lamp 46. To achieve this result, the triac 53 is connected across the timing capacitor 59, so that when the triac 53 conducts it shorts the capacitor 59 to prohibit it from developing a charge that will trigger the triac 54 into a conducting state. The triac 53 conducts when illuminated by the light emitting diode 52 with which it is light coupled. Thus, whenever the test circuit network is operating and there is a simultaneous voltage at the signal terminal 36 the triac 53 draws a small current to prevent the capacitor 59 from charging, and the gate 57 of the triac 54 consequently remains dormant. The triac 54 remains non-conductive, even though a voltage is applied at the signal terminal 36. This shutting off of the signal circuit network protects the pilot light circuitry from any phase displacements that may occur between voltages simultaneously applied to the signal terminal 36 and test terminal 37.

The signal circuit network for the pilot light 35 is subdivided into two branch subcircuits, similarly as the test circuit network. There is a supply branch subcircuit of the triac 54, resistor 56 and capacitor 55 for feeding lamp illuminating current to the transformer 44 and lamp 46, and there is a trigger subcircuit comprising the diac 58, capacitor 59, resistor 60 and triac 53. In this arrangement, there is a physical connection between supply and trigger subcircuits through the triac gate 57, whereas in the other circuits (the text circuit network of pilot light 35 and both the signal and test circuit networks of the pilot light 1) the trigger branch subcircuit is light coupled to the supply branch subcircuit to physically isolate these branch subcircuits. In each instance, however, a triac in the supply branch subcircuit is controlled by its coupling with an associated trigger branch subcircuit. In the embodiments disclosed, the triac of the supply branch subcircuit takes one of two forms, either a light responsive form or a three element form with a gate. The term triac, then, is broadly used to encompass a solid state bidirectional device, i.e. conducts a.c. current in both directions, that can be switched to a conductive state.

The invention provides a three terminal pilot light of solid state components. A separate on-off circuit element, which comprises a triac in the disclosed embodiments, is employed in both the signal circuit network and the test circuit network. Each triac is switched by a trigger branch subcircuit, so that each signal and test circuit network is subdivided into its trigger subcircuit and its supply subcircuit. Further, when desired a transformer can be employed to drop the lamp voltage below control circuit voltage.

We claim:

1. In a pilot light the combination comprising:
   a pilot light lamp;
   a transformer with a secondary winding connected across the lamp and with a primary winding;
   a signal network having a supply branch subcircuit including a first bidirectional solid state switch operatively connected to the primary winding for supplying alternating current that causes illumination of said lamp, and a trigger branch subcircuit in controlling relation to said first bidirectional solid state switch; and
   a test network having a supply branch subcircuit including a second bidirectional solid state switch operatively connected to the primary winding for supplying alternating current that causes illumination of said lamp, and a trigger branch subcircuit in controlling relation to said second bidirectional solid state switch;
   wherein said bidirectional solid state switch in the supply branch subcircuit of said test network is light responsive and wherein the trigger branch subcircuit of said test network in controlling relation to said light responsive solid state switch includes a light emitter;
   wherein the trigger branch subcircuit in said signal circuit network includes a third solid state switch, the third solid state switch being light responsive; and
   wherein the trigger branch subcircuit in said test network includes a second light emitter in controlling relation to the third solid state switch.

* * * * *